United States Patent [19]
Berry, III et al.

[11] Patent Number: 5,333,809
[45] Date of Patent: * Aug. 2, 1994

[54] REEL SUPPORT WITH HORIZONTAL AND VERTICAL ADJUSTMENT

[75] Inventors: William M. Berry, III, Newnan; Doyle B. Charles, Carrollton; Michael F. Flagg, Newnan, all of Ga.

[73] Assignee: Southwire Company, Carrollton, Ga.

[*] Notice: The portion of the term of this patent subsequent to Sep. 21, 2010 has been disclaimed.

[21] Appl. No.: 43,676

[22] Filed: Apr. 8, 1993

Related U.S. Application Data

[63] Continuation-in-part of Ser. No. 812,383, Dec. 23, 1991, Pat. No. 5,246,180.

[51] Int. Cl.5 .................................................. B65H 75/00
[52] U.S. Cl. ................................. 242/578.1; 242/592; 242/596.1
[58] Field of Search ............... 242/54 R, 58.6, 68, 242/68.1, 68.4, 64, 129.51

[56] References Cited

U.S. PATENT DOCUMENTS

| 1,874,904 | 8/1932 | Crafts | 242/58.6 |
|---|---|---|---|
| 2,641,413 | 6/1953 | Bruestle | 242/54 R |
| 2,652,207 | 9/1953 | Goedken | 242/58.6 |
| 4,098,468 | 7/1978 | Skallberg | 242/54 R |
| 4,679,743 | 7/1987 | Dallmaier | 242/54 R |
| 4,706,905 | 11/1987 | Torres | 242/68.4 |
| 5,246,180 | 9/1993 | Berry, III et al. | 242/54 R |

FOREIGN PATENT DOCUMENTS

| 1038453 | 9/1958 | Fed. Rep. of Germany | 242/58.6 |
|---|---|---|---|
| 1263889 | 3/1968 | Fed. Rep. of Germany . | |
| 1961378 | 6/1970 | Fed. Rep. of Germany . | |
| 2519070 | 6/1975 | Fed. Rep. of Germany | 242/54 R |
| 888458 | 1/1962 | United Kingdom . | |
| 9015771 | 12/1990 | World Int. Prop. O. . | |

Primary Examiner—Daniel P. Stodola
Assistant Examiner—John P. Darling
Attorney, Agent, or Firm—James W. Wallis, Jr.; Stanley L. Tate; George C. Myers, Jr.

[57] ABSTRACT

A cable take-up and payoff apparatus for the controlled payout of a continuous cable from a reel comprises a pair of laterally movable housings which support a reel on a pair of pintles and are horizontally spaced from one another by a telescoping member. A power mechanism is provided for operating the telescoping member to laterally move the housings toward and away from one another. The housings are also supported for vertical movement along a pair of upstanding masts and a power mechanism is provided for simultaneously moving the housings up and down. The pintles are independently supported for both vertical and horizontal movement relative to the housings and are thereby independently adjustable by power mechanisms into alignment with openings on the axis of the reel of cable.

20 Claims, 6 Drawing Sheets

FIG. 7

REEL SUPPORT WITH HORIZONTAL AND VERTICAL ADJUSTMENT

CROSS-REFERENCE TO RELATED APPLICATION

This application is a continuation-in-part of U.S. patent application Ser. No. 07/812,383 filed Dec. 23, 1991, now U.S. Pat. No. 5,246,180.

FIELD OF THE INVENTION

The present invention relates to winding and reeling apparatus and more particularly to an apparatus for the controlled take-up or payout of a continuous strand to or from a reel, especially a continuous electrical conductor wound on a large heavy reel.

DESCRIPTION OF THE PRIOR ART

In the manufacture of electrical cable and other continuous strand products, it is often necessary to handle large, heavy reels of the cable or strand product during manufacturing operations. It is also necessary to handle these large reels during storage and shipping operations and when using the product, such as, for instance, in cable laying operations for paying out the cable from a reel.

In some cases, a reel wound with cable may have a diameter ranging up to six to ten feet or more and a weight of several thousand pounds. In order to lift and handle such large and heavy reels, it is not only necessary to provide an apparatus that can support the weight of the reel, but also to provide an apparatus that is capable of being adjusted to accommodate various reel diameters and axial lengths.

The reels on which the cable is wound are usually constructed of a cylindrical reel drum to the ends of which are affixed circular side flanges or plates. The circular flanges are usually provided with central bores or openings which define the reel axis and which are adapted to be engaged by the spindles or pintles of a winding and reeling apparatus. Especially in the case of very large and heavy reels, it frequently happens that the openings which define the reel axis are misaligned so that the reel axis may be inclined with respect to the supporting surface or to the pintle axis of the winding and reeling apparatus.

The foregoing problems associated with lifting and handling large, heavy reels of cable are well known in the art and are described in more detail in U.S. Pat. No. 4,098,468 to Skalleberg, the disclosure of which is incorporated herein by reference. The Skalleberg patent discloses a cable reeling device for handling a double-flanged reel with central reel openings in each flange aligned with the reel axis. According to this patent, the spindles of the reeling device are freely movable vertically and horizontally within a zone around the intended position of the reel axis so that, as the spindle supports are moved toward the reel flanges, the spindles can be manipulated and inserted into the reel openings regardless of the degree of misalignment of the openings from the reel axis. This freely movable feature of the spindles is provided by resilient and slidable couplings between the spindles and the reel support frame. Hydraulic power means are provided for moving the spindles in the vertical direction only, but no power means are disclosed or contemplated for moving the spindles in the horizontal direction. Horizontal positioning of the spindles relative to the reel openings is accomplished by a combination of tapered spindles and manual manipulation of the spindles while the spindle supports are being moved toward one another and toward the respective opening in the reel flanges. Such a manual procedure for aligning the spindles creates a dangerous environment for the operators of the reeling device and could result in serious injury. Thus, the advantage of having manually manipulatable, freely movable spindles is far outweighed by the potential danger of personal injury to operating personnel.

The Skalleberg reeling device is also provided with two hydraulic piston/cylinder power arrangements for moving the spindle supports toward and away one another and for raising and lowering the spindles relative to the spindle support housings. Such hydraulic power means are disadvantageous in that precise incremental control of the position of the spindles is difficult to achieve.

A further disadvantage of the Skalleberg reeling device is that once a heavy reel is lifted from the floor surface by the device, the spindle support housing is vertically locked in place on the frame and cannot be vertically adjusted relative to the frame unless the reel is again lowered to the floor surface. It would be desirable to have the capability of vertically positioning the reel axis at a desired height before locking the spindle support housing to the frame.

Another disadvantage of the Skalleberg reeling device is the location of the telescoping horizontal shaft which connects the two spindle support housings for movement toward and away from each other in relation to the axes of the spindles. In that reeling device the spindle axes are disadvantageously located in a common vertical plane with the telescoping shaft axis. This arrangement precludes the use of an overhead crane to support a full or empty reel in the vertical plane through the spindles either for positioning a reel in alignment with the spindles for engagement therewith or for lifting a reel for removal from the reeling device. According to the Skalleberg construction, if an overhead crane is used to transport a reel to the reeling device, the reel must be placed on the floor spaced from the spindles and then rolled into the correct position between the spindles. When a reel is removed from the device, it must be rolled out of position between the spindles before it can be engaged by an overhead crane. To the extent the reels are manually rolled and positioned relative to the spindles, there is a danger of personal injury to workers who are involved in such manual positioning of the reel, especially when a heavy, cable-filled reel is moved or positioned. It would be desirable, therefore, to be able to suspend a reel at a precise location between the spindles with a crane so that manual positioning or rolling of the reel into position is unnecessary.

SUMMARY OF THE INVENTION

In view of the foregoing limitations and shortcomings of the prior art reeling apparatus, as well as other disadvantages not specifically mentioned above, it should be apparent that there still exists a need in the art for a cable take-up/payoff apparatus that overcomes those disadvantages and is particularly safe to operate.

The apparatus of the present invention comprises right and left housing or portal assemblies, each of which is mounted for vertical movement on a respective upstanding mast supported on a respective right and left base assembly. Each housing assembly carries a respective spindle or pintle assembly having a tapered pintle which is adjustable relative to the housing assembly in both the vertical and horizontal directions and which is also pivotally suspended from the pintle assembly for arcuate movement about an axis spaced above the pintle axis.

A portal traverse assembly is connected between the right and left housing assemblies and is provided with power means for moving the housing assemblies and their respective masts and base assemblies toward and away from one another. The traverse assembly is used first to enlarge the spacing between the pintles so as to accommodate between the left and right housing assemblies a reel having a given dimension between its flanges and then to decrease the spacing between the pintles to cause the pintles to engage in the reel flange openings. Advantageously, the reel may be suspended between the pintles by an overhead crane or other lifting means.

If the pintle axes are misaligned with the reel openings, the power means for the pintle assemblies may be operated to move the pintles both vertically and horizontally into alignment with the reel openings before the portal traverse assembly is operated to move the left and right housing assemblies toward one another. Any minor misalignment between the pintle axes and the reel openings may be accommodated by the tapered ends of the pintles and the arcuate pivoting of the pintles about pivot axes spaced slightly above the pintle axes. This alignment of the pintle axes with the reel opening is safely carried out in its entirety by a crane and by power means thereby requiring no manual manipulation of the pintles or the reel by the machine operator.

When the reel openings have been fully engaged by the pintles, the pintle assemblies, or preferably the housing assemblies, are simultaneously raised vertically a distance sufficient to lift the reel from the floor or other support surface. With the reel suspended above the floor, one or both pintles may optionally be moved horizontally to their zero or centered positions to "true up" the reel openings into substantial alignment with the reel axis. The left and right housing assemblies may then be raised on their respective masts to position the reel axis at approximately the preferred elevation for payout of a cable from the reel. The pintle assemblies are then operated to raise the pintles into engagement with recesses in the housing side plates to lock the pintles into their aligned positions for cable payoff. As the pintles engage in their respective recesses a pair of cap screws on each pintle assembly engages a pivotable locking arm assembly for each housing and urges it into positive locking engagement with the mast associated with that housing to prevent vertical slippage of the housing assembly relative to the mast and to relieve the stress on the power means for vertically raising the housing relative to the mast.

In the preferred embodiment of the invention, the power means comprise high torque electrical gearmotors or motor/gear reducer combinations with drive screw and drive nut arrangements for more accurate positioning of the housing assemblies, pintle assemblies and pintles than would otherwise be possible with, for example, hydraulic power means. One of the pintle assemblies is provided with a brake assembly which is engagable with one of the reel flanges so that cable payout can be controlled by braking the rotation of the pintle thereby maintaining a desired degree of tension on the cable as it pays off the reel. If desired, the braking assembly may also be used in connection with a drive means for rotating the pintle so that the cable payoff apparatus of the invention may be used as a cable take-up apparatus as well as a payoff apparatus. Each base assembly is provided with a pair of wheels mounted to a drive axle. One or both of the wheels may be flanged for engaging with one or a pair of rails for guiding the apparatus along a given path of travel. A drive motor is provided on one base assembly and is connected to the wheel shaft for that assembly by a drive sprocket and roller chain arrangement so that the entire apparatus may be moved across the floor or along the path of travel of the rails.

With the foregoing and other advantages and features of the invention that will become hereinafter apparent, the nature of the invention may be more clearly understood by reference to the following detailed description of the invention, the appended claims and to the several views illustrated in the drawings.

DESCRIPTION OF THE INVENTION

Figure 1:
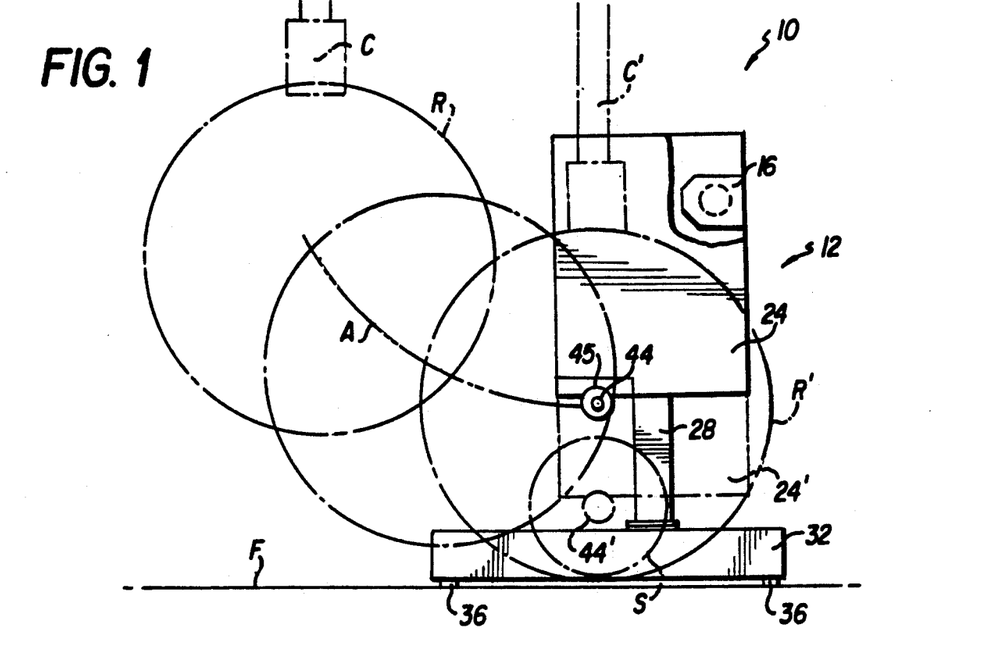
FIG. 1 is a side elevation view of the cable take-up/payoff apparatus of the present invention illustrating in phantom lines he positioning of a large reel between the pintles by means of a crane.
Figure 2:
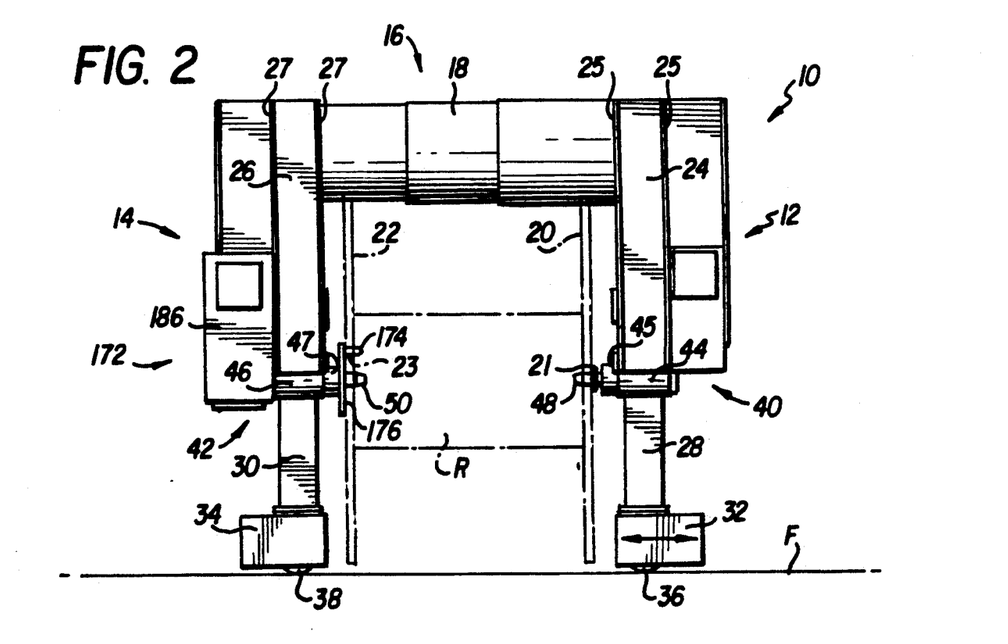
FIG. 2 is a front elevation view of the apparatus of the invention showing a reel in phantom lines positioned on the pintles.

Referring now in detail to the drawings, there is illustrated in FIGS. 1 and 2 a cable payoff/take-up apparatus according to the present invention, which is designated generally by reference numeral 10. Shown in phantom lines in FIG. 1 is a sequence of reel positions when a reel R is loaded into or removed from the apparatus 10 by means of a crane C as more fully described hereinafter. Apparatus 10 comprises a right hand portion 12 and a left hand portion 14 which are movable toward and away from each other by a telescoping portal traverse assembly 16 shown covered in a telescoping housing 18 in FIG. 2. A reel R of cable shown in phantom lines in FIG. 2 is supported for payoff in a manner to be described between the right and left hand portions 12, 14 of the apparatus 10 and includes a pair of spaced reel flanges 20, 22 with central openings 21, 23 which define the reel axis. The reel R may also be an empty reel supported on the right and left hand portions 12, 14 for take-up of cable, such as an electrical cable.

The right and left hand portions 12, 14 each comprise a respective right portal or housing assembly 24 and a left portal or housing assembly 26 mounted for up-and-down vertical movement on a respective upstanding mast 28, 30. The masts 28, 30 are supported on respective base assemblies 32, 34 which are movable across a supporting surface or floor F on wheels 36, 38. Each housing assembly 24, 26 supports a respective right and left pintle assembly 40, 42 from which are suspended pintles or pintle sleeves 44, 46 having tapered pintle shafts 48, 50 which are engagable in the central openings 21, 23 in the flanges 20, 22 of the reel 18. Pintle shafts 48, 50 are preferably rotatably mounted in pintle sleeves 44, 46 by means of spaced anti-friction bearings, such as roller and ball bearings. In their uppermost positions, pintle sleeves 44, 46 are seated in arcuate recesses 45, 47 in the side plates 25, 27 of the housing assemblies 24, 26.

As best seen in FIG. 1, the axis of portal traverse assembly 16 is horizontally offset from the axes of the pintle sleeves 44, 46 and pintle shafts 48, 50. This arrangement advantageously permits the crane C to be moved into position C' directly above the axes of the pintle sleeves 44, 46. Thus, the reel R can be suspended from the crane C and lowered along an arc A so as to position the reel D with the flange openings 21, 23 as closely as possible to the axes of the pintle shafts 48, 50. This position is shown in FIG. 1 as R' and in this position the reel can be lowered by the crane to rest upon floor F without the need to manually roll the reel R into position for engagement of the pintle shafts 48, 50 in the flange openings 21, 23.

Also illustrated in FIG. 1 in phantom is a smaller reel S which can be supported in the apparatus 10 by lowering the housing assemblies 24, 26 a position designated by reference numeral 24' so that the shafts of pintle sleeves 44, 46 are engagable with the flange opening of the reel S as depicted by reference numeral 44'.

Figures 3, 4:
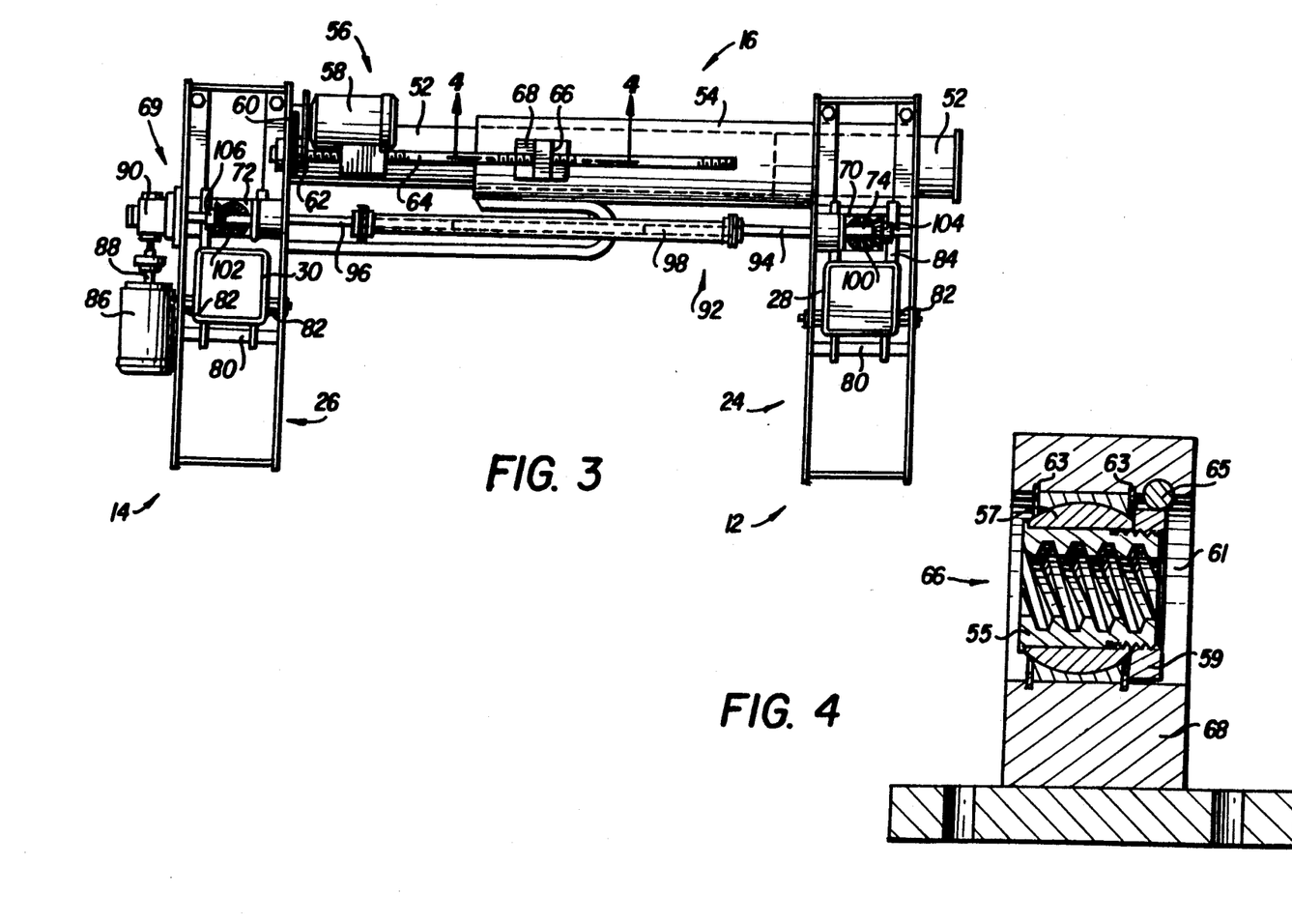
FIG. 3 is a top plan view, partly in cross-section, of the portal traverse assembly of the apparatus of the present invention.
FIG. 4 is a cross-sectional view of the traverse drive nut of the traverse assembly taken along line 4—4 of FIG. 3.

Referring now to FIGS. 3 and 4, the portal traverse assembly 16 comprises a solid shaft 52 extending from the left housing assembly 26 into telescoping relation with a hollow shaft or tube 54 mounted to the right housing assembly 24. The telescoping shafts 52, 54 provide support for the right and left hand portions 12, 14 and telescope when the spacing between the portions 12, 14 is varied by the power means 56. Power means 56 comprises a helical gearmotor 58 mounted to the left housing assembly 26 and connected by a roller chain 60 and sprocket (not shown) to a sprocket 62 fixed to a helical drive screw 64 rotatably mounted to the left housing assembly 26 by means of anti-friction bearings. A pivoting drive nut assembly 66 is mounted in a bracket 68 affixed to hollow shaft 54 and drive screw 64 is threaded through drive nut assembly 66. When it is necessary to increase or decrease the spacing between the right and left hand portions 12, 14 of the apparatus 10, the gearmotor 58 is operated in one direction or the other to cause the roller chain 60 to rotate drive screw 64 via sprocket 62. As screw 64 rotates in pivoting drive nut 66, an axial force is generated which, those skilled in the art will appreciate, either urges the right and left hand portions 12, 14 apart or pulls them together, depending on the direction of rotation of the screw 64.

In FIG. 4 there is illustrated the details of construction of the pivoting drive nut assembly 66 mounted in bracket 68. The assembly 66 comprises a drive nut 55 mounted in a spherical bearing 57 and secured therein by a clamp nut 59. Spherical bearing 57 is fastened in a bore 61 of bracket 68 by retaining rings 63. A dowel pin 65 limits the counterclockwise pivoting (as viewed in FIG. 4) of the drive nut 55 in spherical bearing 57 and also prevents rotation of the drive nut 55 relative to bracket 68.

Figure 5:
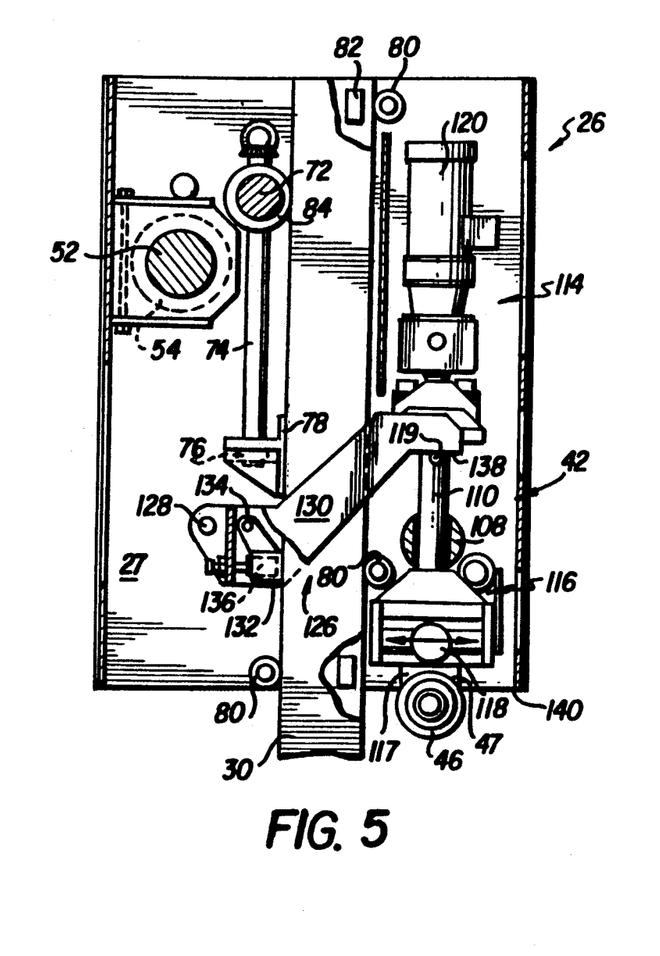
FIG. 5 is a side elevation view, partly in cross-section, of the left housing assembly of the apparatus of the present invention.
Figure 6:
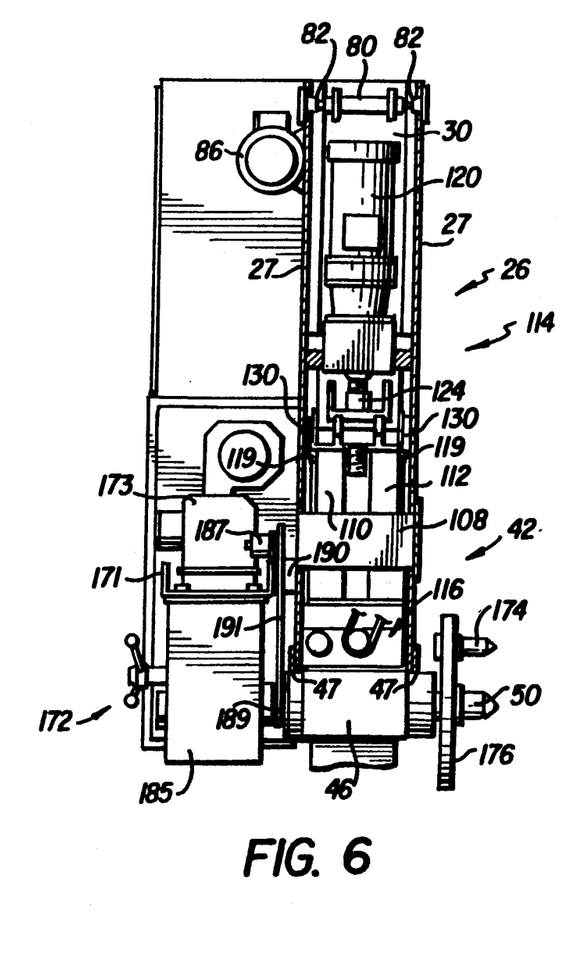
FIG. 6 is a front elevation view, partly in cross-section, of the left housing assembly.
Figure 7:
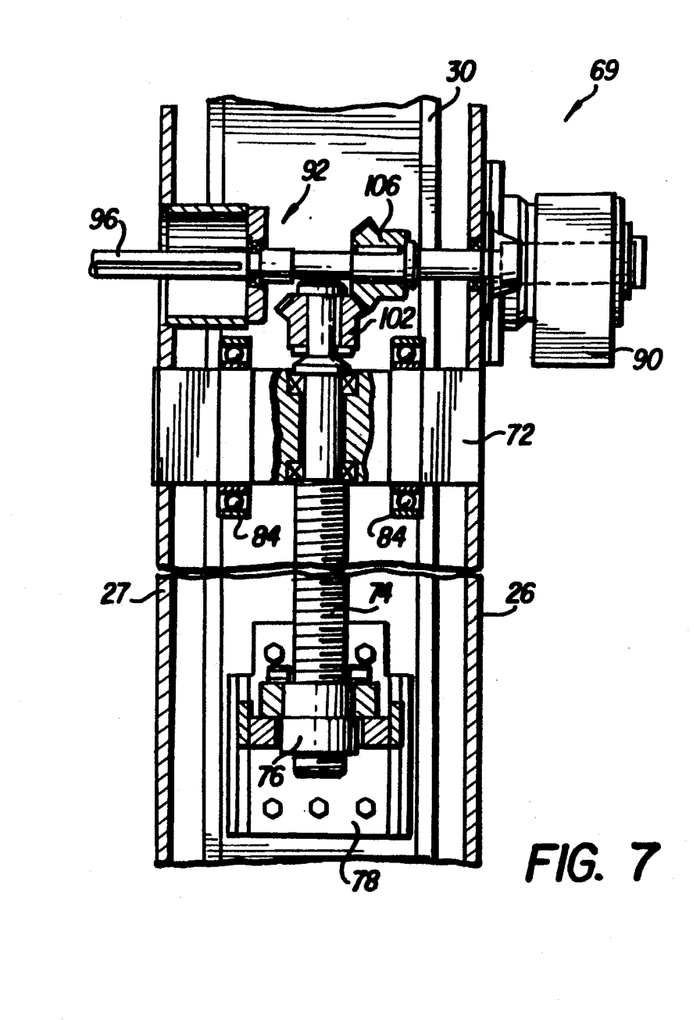
FIG. 7 is an elevation view, partly in cross-section, of the housing lift assembly for the left housing assembly.

Now referring to FIGS. 3, 5 and 7, the operation of the housing lift assembly 69 will be described. Lift assembly 69 is connected to both the left and right housing assemblies 24, 26 for simultaneously raising and lowering the assemblies 24, 26 on their respective masts 28, 30. Screw housings 70, 72 are rigidly mounted to the frames of housing assemblies 24, 26 and rotatably support helical drive screw shafts 74 which are threadably engaged with drive nuts 76 (only one shown). Drive nuts 76 are fixedly mounted to brackets 78 (FIG. 5) which are bolted, welded or otherwise affixed to a respective mast 28, 30. As best seen in FIGS. 5 and 6, the housing assembly 26 is rollably supported on the mast 30 by a plurality of reaction rollers 80, 82 which are mounted to the housing assembly for rolling engagement with the mast surfaces. Roller bearings 84 mounted to screw housings 70, 72 also rollably engage the mast surfaces. The housing assembly 24 is rollably supported on its mast 28 with a similar roller arrangement (not shown). It will be appreciated that rotation of drive screws 74 in drive nuts 78 will cause a respective housing assembly 24, 26 to be raised or lowered vertically relative to the masts 28, 30.

Since it is important that the housing assemblies 24, 26 be vertically raised and lowered together, i.e., simultaneously, the drive screws 74 must be rotated together at the same speed. This is accomplished by using a single drive means interconnected with both drive screws 74 as is best illustrated in FIGS. 3 and 7. Drive motor 86 is mounted to the housing assembly 26. A shaft 88 connects motor 86 to gear reducer 90 also mounted to housing assembly 26. Gear reducer 90 drives a drive shaft 92 rotatably mounted to the housing assemblies 24, 26. Drive shaft 92 comprises two end sections 94, 96 which telescope into a splined torque tube 98 (FIG. 3) to permit adjustment of the axial length of the shaft 92 when the housing assemblies 24, 26 are moved toward and away from one another by the portal traverse assembly 16. Fixed to the upper ends of the drive screws 74 are respective bevel gears 100, 102 which mesh with bevel gears 104, 106 fixed respectively to shaft portions 94, 96.

Thus, when motor 86 is energized to rotate in one or the other direction, the shaft 88 drives gear reducer 90 which, in turn, rotatably drives shaft 92. Rotation of shaft 92 rotates bevel gears 104, 106 meshed with bevel gears 100, 102 respectively, and thus simultaneously rotates each drive screw 74 an equal number of turns so that both housing assemblies 24, 26 are moved an equal vertical distance up or down on their respective masts 28, 30.

In FIGS. 5 and 6 there is illustrated the left housing assembly 26 in which the left pintle assembly 42 is mounted for vertical reciprocating movement within the housing assembly. The right pintle assembly 40 (FIG. 10) is substantially identical to the left pintle assembly 42 so that only one of such assemblies will be described in detail. To the extent there are any differences in those assemblies that are important in understanding the invention, such differences will be described hereinafter. Pintle assembly 42 comprises a slide housing 108 which is fixed to the side plates 27 of housing assembly 26. A pair of pintle support shafts 110, 112 are slidably supported in the slide housing 108 for vertical movement. Support shafts 110, 112 are mounted at their upper ends to a pintle lift screw assembly 114 as described in more detail hereinafter in connection with FIGS. 8 and 9. The lower ends of the support shafts 110, 112 are connected to the pintle traversing assembly 116. Pintle 46 is pivotally suspended beneath pintle traversing assembly 116 by links 117 from a shaft 118 which is horizontally reciprocable in the directions shown by the arrow in FIG. 5 by a mechanism described hereinafter in connection with FIGS. 10 and 11. A pair of socket head cap screws 119 (FIGS. 5 and 6) are mounted on the outwardly facing surfaces of the support shafts 110, 112 for a purpose to be described.

Pintle lift screw assembly 114 comprises a helical gearmotor 120 mounted in the housing assembly 26. Gearmotor 120 rotatably drives a lift screw 122 threaded into a lift nut 124 fixed relative to the upper ends of the support shafts 110, 112. When gearmotor 120 is energized to rotate in one direction or the other, lift screw 122 rotates in lift nut 124 and the support shafts 110, 112 together with pintle assembly 42 will be vertically moved up or down relative to housing assembly 26.

Figure 8:
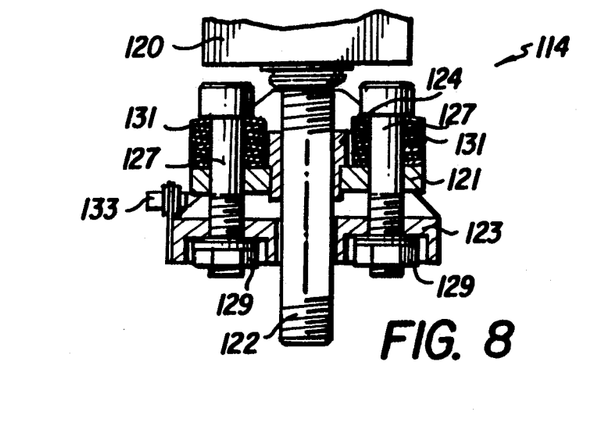
FIGS. 8 and 9 are a fragmentary side and end elevation views, respectively, partly in cross-section, showing details of the dual shaft support for the pintle lift assembly of the left housing assembly.
Figure 9:
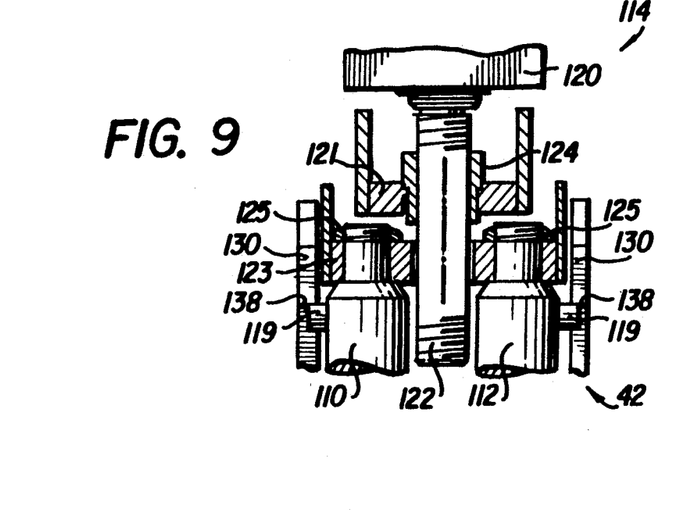

Referring now to FIGS. 8 and 9, the connection between the pintle lift screw assembly 114 and the pintle assembly 42 will be described. Lift screw 122 is threaded into lift nut 124 which is mounted in a nut plate 121. The upper ends of support shafts 110, 112 pass through bores in a lift plate 123 and are secured to lift plate 123 by locknuts 125. Nut plate 121 and lift plate 123 are resiliently connected together as shown in FIG. 8 by a pair of socket head cap screws 127 and locknuts 129. This connection is made resilient by a plurality of Belleville spring washers 131 on each cap screw 127. A proximity switch 133 may be mounted on lift plate 123 to limit the upper vertical travel of lift plate 123. The proximity switch 133 is connected in the electrical circuit which controls power to the gearmotor 120.

A locking means 126 is pivotally mounted to the side plates 27 of housing assembly 26 by a shaft 128 and comprises a pair of locking arms 130 (only one shown in FIG. 5) which extend past mast 30 on both sides thereof and engage the cap screws 119 on the support shafts 110, 112. See also FIG. 9. A locking bar 132 pivotally mounted to the locking arms 130 by a locking bar shaft 134 engages one side of the mast 30. A spring cylinder 136 resiliently bears on the side of the locking bar 132 away from the mast 30 and is adapted to apply a large, but somewhat resilient, locking force to the mast in a manner to be described.

Assume the pintle assembly 42 is lowered to a position where the undersurface 138 of the locking arms 130 are disengaged from the cap screws 119. The cantilevered weight of the arms 130 will cause the locking bar 132 to bear against the surface of the mast 30 with a relatively slight pressure. Such pressure is not sufficiently great, however, to prevent vertical movement of the housing assembly 26 by means of the housing lift assembly 69, and drive screw 74. When pintle lift screw assembly 114 is operated to raise pintle assembly 42, the cap screws 119 will engage undersurfaces 138 of locking arms 130 and urge locking arms 130 counterclockwise as viewed in FIG. 5. Such counterclockwise urging will force locking bar 132 into tighter gripping engagement with the mast 30 under the resilient force of spring cylinder 136 to thereby lock the housing assembly 26 to the mast 30 and prevent vertical movement or slippage of the housing assembly along the mast. At the same time, the pintle 46 will be raised into rigid, locking engagement with arcuate recesses 47 in the lower edges 140 of the side plates 27 of housing assembly 26.

Figure 10:
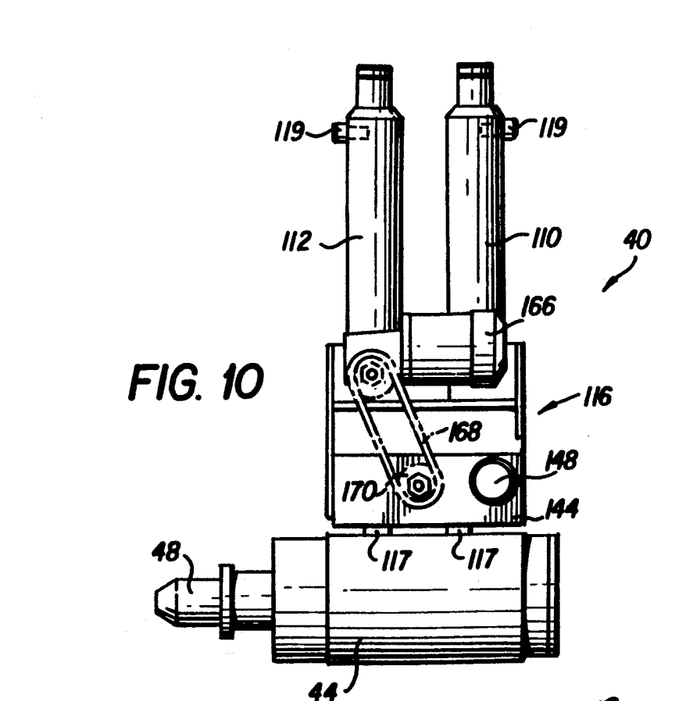
FIGS. 10 and 11 are fragmentary views of the right pintle assembly and right pintle traversing assembly, respectively.
Figure 11:
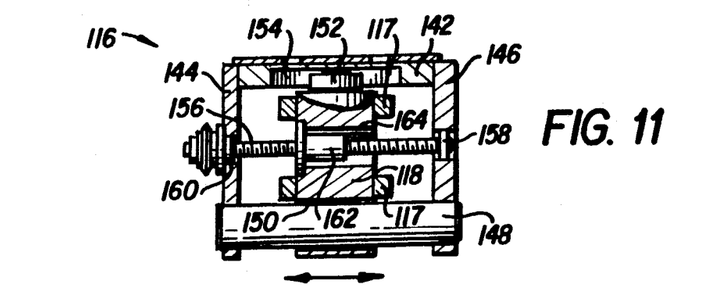

With reference now to FIGS. 10 and 11, the mechanism for horizontal positioning of the pintles 44, 46 will be described with reference to the right pintle assembly 40 and pintle 44. The pintle 44 is pivotally suspended by a pair of links 117 from pintle traversing assembly 116 mounted at the bottom of the pintle assembly 40. Pintle traversing assembly 116 includes a pintle support shaft 118 mounted so that its axis is translatable in a horizontal plane in the directions shown by the arrows in FIG. 11. The support assembly 116 comprises an end plate 142 and two side plates 144, 146 to the latter of which is mounted a pintle bearing shaft 148. Shaft 148 passes slidably through a bore 150 in one end of the pintle support shaft 118. A cam roller 152 is mounted axially to the other end of pintle support shaft 118 and is guided in a roller track 154 in end plate 142.

Horizontal movement of shaft 146 is achieved by a drive screw 156 which is rotatably mounted in bearings 158, 160 in respective side plates 144, 146. Drive screw 156 is threaded through a drive nut 162 mounted in a bore 164 in shaft 118. As drive screw 156 is rotated in drive nut 162, drive shaft 118 will move in one horizontal direction or the other as shown by the arrow in FIG. 11. Drive screw 156 is rotatably driven by a helical gearmotor 166 which drives a chain 168 and sprocket 170 fixed to the end of drive screw 156.

It will be appreciated by those skilled in the art that the various sprockets engagable with a roller chain may be torque limiting sprockets where appropriate. Similarly, those skilled in the art will be able to select from conventional off-the-shelf equipment appropriate gearmotors, electrical motors, bearings, drive nuts and screws etc. for carrying out the present invention.

Referring again to FIGS. 2 and 6 it will be seen that the left hand pintle assembly 42 has a take-up drive means 172 affixed to the outer end of the pintle shaft 50. A drive dog 174 is affixed to a drive arm 176 which is fixed to the inner end of pintle shaft 50. The drive dog 174 and take-up drive means 172 are used to rotate the reel R during take-up and to prevent overrunning of the reel R during payoff.

Figure 12:
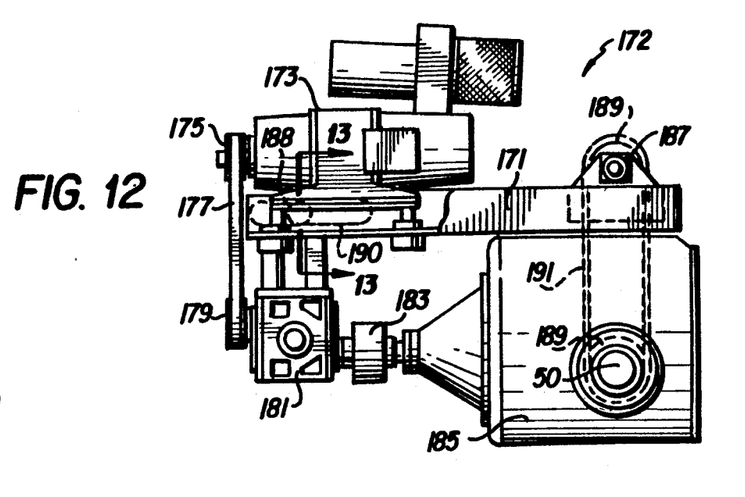
FIG. 12 is a fragmentary side elevation view of the take-up drive assembly for the left pintle assembly.

FIG. 12 illustrates the take-up drive means 172 in more detail. The drive means 172 comprises a drive base 171 to one end of which is mounted a force ventilated DC drive motor 173. A toothed sprocket 175 affixed to the shaft of drive motor 173 drives a toothed belt 177 which drives, in turn, a toothed sprocket 179 connected to a multispeed gearbox 181. Gearbox 181 is connected by a Falk coupling 183 or other suitable connector, to a gear reducer 185 mounted to the opposite end of drive base 171. Gear reducer 185 is drivingly connected to pintle shaft 50 which is rotatably supported in left pintle sleeve 46. An optical encoder 187 mounted to drive base 171 is connected by sprockets 189 and a chain 191 to the pintle shaft 50 and senses the rate of rotation of the pintle shaft 50. The output of optical encoder 187 may be used to control the take-up or payoff speed of the drive means 172 in any conventional manner.

Figure 13:
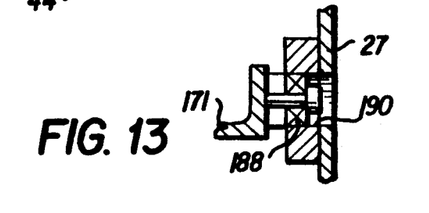
FIG. 13 is a fragmentary detail of the drive torque slot and cam roller taken along line 13—13 of FIG. 12.

The take-up drive means 172 is supported on the pintle shaft 50 for vertical movement therewith within its housing 186 (FIG. 2). A cam roller 188 fixed to drive base 171 (FIGS. 12 and 13) is rollably guided in a drive torque slot 190 affixed to the outer side plate 27 of the housing assembly 26 and provides a reaction point from which the drive means applies rotational torque to the pintle shaft 50. The cam roller 188 is movable along the longitudinal extent of the drive torque slot 190 to accommodate vertical movement of the pintle assembly 42 relative to the housing assembly 26.

Figure 14:
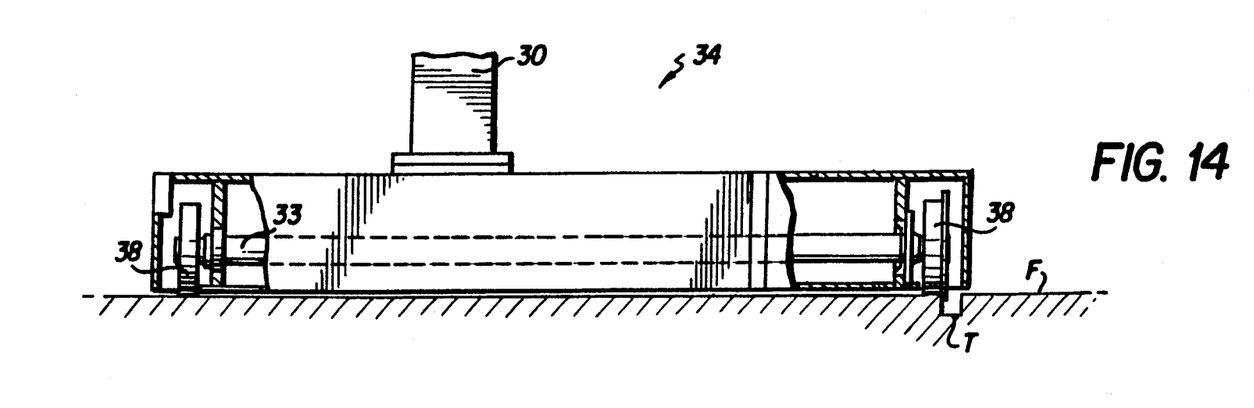
FIGS. 14–16 are fragmentary views, partly in cross-section, of the right and left base assemblies, with FIG. 16 being a cross-section taken along line 16—16 of FIG. 15.
Figure 15:
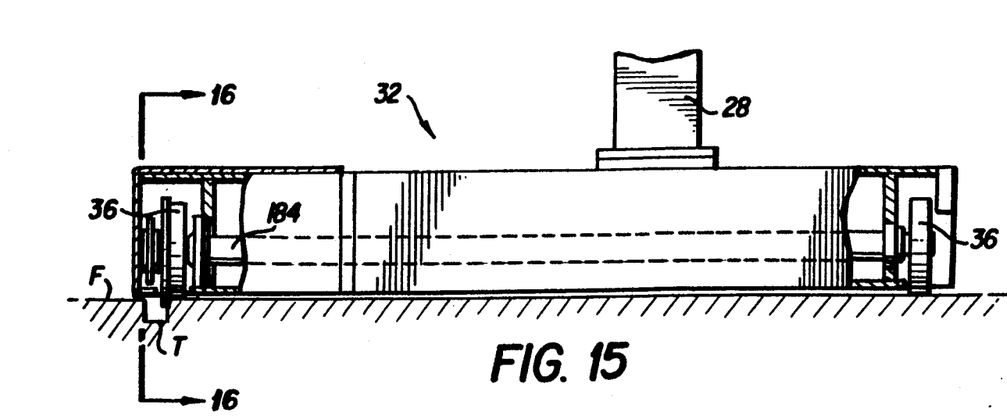
Figure 16:
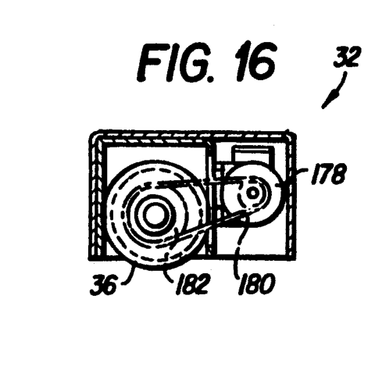

FIGS. 14–16 illustrate the manner in which the apparatus 10 can be moved along the floor F under power. A drive motor 178 is mounted on base assembly 32 and drives a roller chain 180 which rotates a sprocket 182 fixed to axle 184. Rotation of axle 184 drives the wheels 36 and causes the apparatus 10 to travel transversely across the floor F as indicated by the arrows in FIG. 2. Base 34 travels on wheels 38 mounted on non-driven axle 33. One or both of the wheels of each wheel pair 36, 38 on each axle may be flanged to engage one or two rails T set in the floor F or other supporting surface.

The cable take-up or payoff apparatus 10 of the invention operates as follows. If the spacing between opposing pintle shafts 48, 50 is insufficient to accommodate a reel R of given width, the portal traverse assembly 16 is operated to cause the shafts 52, 54 to telescope outwardly and move the left and right hand portions 12, 14 of the apparatus 10 away from each other. A reel R is positioned by crane C at a location resting on the floor F between the portions 12, 14 with the reel flanges 20, 22 confronting a respective pintle shaft 48, 50. Depending on the initial positioning of the pintles 44, 46 and the locations of the reel openings 21, 23 with respect thereto, the portal or housing lift assembly 69 and/or the pintle assemblies 40, 42 are operated to raise or lower the pintle shafts 48, 50 together or independently of one another to vertically align the pintle shafts with the reel openings at a position below the lower edges 140 of the housing assemblies 24, 26. In this position, the pintle sleeves 44, 46 are free of the recesses 45, 47 in the side plates 25, 27 and can pivot to a limited degree about the axes of their support shafts 118. The pintle support assembly 116 (FIGS. 10 and 11) for each pintle 44, 46 is then operated by means of gearmotor 166 to horizontally shift the axes of the pintle shafts 48, 50 independently of one another into a substantially horizontally aligned position with the reel openings 21, 23. In this condition, the pintle shafts 48, 50 are substantially aligned with the reel openings 21, 23 regardless of any distortion of the reel axis.

The portal traverse assembly 16 is then operated to telescope shafts 52, 54 inwardly and thereby cause the pintle shafts 48, 50 to enter a respective reel opening 21, 23 and to engage the drive dog 174 in a dog opening (not shown) in reel flange 22. The housing lift assembly 69 is then operated to raise the housing assemblies 24, 26 and thereby lift the reel R from the floor F to a position somewhat below the desired final height of the reel.

With the reel R suspended above the floor F, the lift screw assemblies 114 for the left and right pintle assemblies 40, 42 are operated to raise the pintle assemblies 40, 42 until the pintle sleeves 44, 46 engage in their respective recesses 45, 47 in the lower edges of the side plates 25, 27 of the housing assemblies 24, 26. In the event one or both of the pintle sleeves 44, 46 is horizontally offset from its respective recess 45, 47, the sleeve will pivot about shaft 118 to the extent necessary to engage in the recess and cause the pintle shafts 48, 50 to be in axial alignment. Movement of the pintle sleeves 44, 46 into the recesses 45, 47 will "true up" the reel R and position the reel openings 21, 23 along a common axis with the pintle shafts 48, 50. It may be desirable to operate the support assembly 116 with gearmotor 166 to reposition the pintle sleeves 44, 46 directly beneath the respective recess 45, 47 before the pintle assemblies 40, 42 are raised to engage the pintle sleeves in the recesses. Such repositioning of the sleeves will "true up" the reel R.

When the pintle sleeves 44, 46 engage firmly in the recesses 45, 47, the cap screws 119 of each pintle assembly 40, 42 engage the undersurfaces 138 of the locking arms 130 as described above and positively lock the housing assemblies 24, 26 against vertical movement or slippage along the masts 28, 30.

It should be apparent from the foregoing description that the present invention provides significant advantages over the known apparatus, especially with regard to personnel safety and the ease of handling large reels with an overhead crane.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Apparatus for winding and reeling cable upon a reel having reel openings disposed on a reel axis, said apparatus being adapted to rest upon a support surface and comprising:

first and second masts;

first and second spaced housing assemblies, each supported for vertical movement on a respective mast;

means connected to said housing assemblies for laterally moving the housing assemblies toward and away from one another;

first power means connected between said masts and said housing assemblies for raising and lowering said housing assemblies on said masts;

first and second pintles each supported on a respective housing assembly;

a pair of second power means each operative independently of the first power means, supported by a respective housing assembly and connected to a respective pintle for moving such pintle vertically relative to the housing assembly associated therewith, each second power means comprising a pair of support shafts for supporting its associated pintle, a drive nut connected to the support shafts and a drive screw threadably engaged with the drive nut for vertically moving the first pintle; and a pair of third power means operative independently of the first and second power means, supported by a respective housing assembly and connected to a respective pintle for moving such pintle horizontally relative to the housing assembly associated therewith.

2. Apparatus according to claim 1, including means connected to the housing assemblies for simultaneously raising and lowering the housing assemblies relative to the support surface.

3. Apparatus according to claim 2, wherein said raising and lowering means comprises a first drive screw threadably engaged with a first drive nut and being connected to the first housing assembly, a second drive screw threadably engaged with a second drive nut and being connected to the second housing assembly, and power lift means connected to said first and second drive screws for simultaneously rotating said drive screws.

4. Apparatus according to claim 3, wherein said first and second masts support a respective one of said first and second housing assemblies, said first and second drive nuts being affixed to a respective first and second mast.

5. Apparatus according to claim 3, wherein said power lift means comprises a longitudinally extensible shaft rotatably mounted to said first and second housing assemblies, said shaft being drivingly connected to said first and second drive screws and a motor for rotatably driving said shaft.

6. Apparatus according to claim 5, wherein said power lift means further includes bevel gears mounted to each drive screw and to said shaft, the bevel gears on the shaft being drivingly meshed with the bevel gears on the drive screws.

7. Apparatus according to claim 1, wherein each third power means comprises a further drive screw threadably engaged with a further drive nut for the horizontal movement of the pintle.

8. Apparatus according to claim 1, including recesses in said housing assemblies for receiving the pintles, said second and third power means being operative to position the pintles in first positions in substantial alignment with the reel openings of a reel supported by the support surface and in second positions fixedly engaged in said recesses.

9. Apparatus according to claim 8, wherein said first and second masts support said first and second housing assemblies, respectively, means connected to the housing assemblies for raising and lowering the housing assemblies vertically relative to the support surface, first and second locking means pivotally mounted to said first and second housing assemblies for releasably locking said housing assemblies against vertical movement along the mast associated therewith when said pintles are positioned in said second position.

10. Apparatus according to claim 9, including means on said support shafts engagable with said locking means for urging said locking means into locking engagement with said masts.

11. Apparatus according to claim 1 wherein said means for laterally moving the housing assemblies comprises a telescoping support member and a drive screw and drive nut arrangement connected between one of said housing assemblies and said telescoping support member.

12. Apparatus according to claim 11, wherein said telescoping support member comprises a pair of telescoping shafts, said drive nut being affixed to one of said shafts and said drive screw being rotatably mounted to one of said housing assemblies and threadably engaged with said drive nut and motor means connected to said drive screw for rotating said drive screw.

13. Apparatus according to claim 1, wherein said means for laterally moving the housing assemblies toward and away from one another is horizontally displaced from the axes of the first and second pintles whereby the vertical space above the pintle is accessible by an overhead crane.

14. Apparatus according to claim 1, including a slide housing mounted to said housing assembly, said slide housing having a pair of bores extending therethrough, said support shafts being slidable in the bores of said slide housing.

15. Apparatus according to claim 1, including means connected to one of said pintles for rotating such pintle and means connected to said pintle for sensing the rate of rotation of said pintle.

16. Apparatus for winding and reeling cable upon a reel having reel openings disposed on a reel axis, said apparatus being adapted to rest upon a support surface and comprising:
first and second masts;
first and second housing assemblies, each supported for vertical movement on a respective mast;
first power means connected between said housing assemblies and masts for simultaneously vertically moving said housing assemblies on said masts;
first and second pintles each supported on a respective housing assembly;
a pair of second power means each associated with and supported by a respective housing assembly for moving a respective pintle vertically relative to the housing assembly; and
a pair of third power means each associated with and supported by a respective housing assembly for moving a respective pintle horizontal relative to the housing assembly, said first, second and third power means being operable independently of each other.

17. Apparatus according to claim 16, including means for laterally moving the housing assemblies toward and away from one another, said lateral moving means being horizontally displaced from the axes of the first and second pintles whereby the vertical space above the pintle is accessible by an overhead crane.

18. Apparatus according to claim 16, wherein each second power means comprises a slide housing mounted to the respective housing assembly, said slide housing having a pair of bores extending therethrough, a pair of spaced support shafts connected to each pintle, said support shafts slidably extending through said bores.

19. Apparatus according to claim 18, wherein said third power means is supported with its respective pintle by said pair of support shafts.

20. Apparatus according to claim 18, including means for locking each housing assembly to its respective mast, means fixed to said support shafts for operating said locking means in response to upward vertical movement of said support shafts.

* * * * *